United States Patent
Kulshreshtha et al.

(10) Patent No.: US 8,946,326 B2
(45) Date of Patent: Feb. 3, 2015

(54) BIMODAL POLYETHYLENE COMPOSITION FOR INJECTION MOULDED ARTICLES

(75) Inventors: Bhawna Kulshreshtha, Linz (AT); Luc Monnissen, Arsimont (BE); Laurent Blayac, Saint Nazaire (FR)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/805,419

(22) PCT Filed: Jun. 28, 2011

(86) PCT No.: PCT/EP2011/060763
§ 371 (c)(1),
(2), (4) Date: May 23, 2013

(87) PCT Pub. No.: WO2012/000958
PCT Pub. Date: Jan. 5, 2012

(65) Prior Publication Data
US 2013/0237652 A1 Sep. 12, 2013

(30) Foreign Application Priority Data
Jun. 29, 2010 (EP) .................................... 10167618

(51) Int. Cl.
*C08K 5/20* (2006.01)
*B29C 45/00* (2006.01)
*C08L 23/04* (2006.01)
*C08L 23/06* (2006.01)
*C08K 3/34* (2006.01)
*C08K 3/00* (2006.01)
*C08K 5/00* (2006.01)

(52) U.S. Cl.
CPC . *C08K 5/20* (2013.01); *C08L 23/04* (2013.01); *C08L 23/06* (2013.01); *C08K 3/34* (2013.01); *B29C 45/0001* (2013.01); *C08K 3/0033* (2013.01); *C08K 5/005* (2013.01)
USPC ....................................... 524/232; 264/328.1

(58) Field of Classification Search
USPC .......................................................... 524/232
See application file for complete search history.

(56) References Cited

U.S. PATENT DOCUMENTS 7,671,106 B2 * 3/2010 Markovich et al. ........... 521/144
2006/0199911 A1 9/2006 Markovich et al.

FOREIGN PATENT DOCUMENTS

| EA | 200801837 A1 | 2/2009 |
| EP | 1591475 A1 | 11/2005 |
| EP | 1834986 A1 | 9/2007 |
| RU | 200614305904 | 5/2005 |
| RU | 2006143059 A1 | 6/2008 |
| WO | WO 0071615 A1 * | 11/2000 |
| WO | 2009092691 A1 | 7/2009 |

OTHER PUBLICATIONS

Russian Office Action.

* cited by examiner

*Primary Examiner* — Hui Chin
(74) *Attorney, Agent, or Firm* — Tarolli, Sundheim, Covell & Tummino LLP

(57) ABSTRACT

Bimodal high density polyethylene composition for producing molded articles comprising—an ethylene homopolymer or an ethylene alpha-olefin copolymer which is a bimodal high density polymer (COMPONENT A) in combination with—an alphanucleating agent (COMPONENT B),—a slip agent being a primary fatty acid amide, (COMPONENT C) and—one or more additives selected from antioxidants, acid scavengers, pigments and UV-stabilizers (COMPONENT D), the composition showing an increased the crystallization temperature and a decreased coefficient of friction compared to a bimodal HDPE composition prepared with the sole use of nucleating agent and compared to the sole use of a slip agent; and its use for producing injection molded articles, especially caps and closures.

9 Claims, No Drawings

BIMODAL POLYETHYLENE COMPOSITION FOR INJECTION MOULDED ARTICLES

RELATED APPLICATION

This application is a National Phase filing of PCT/EP2011/060763, filed Jun. 28, 2011, which claims priority from European Application No. 10167618.7, filed Jun. 29, 2010, the subject matter which are incorporated herein by reference in their entirety.

The present invention relates to a polyethylene composition for injection moulded articles, in particular for caps and closure articles.

The use of bimodal polyethylene in the manufacture of injection moulded articles like caps and closures for bottles is known. In order to be suitable for use in these applications, it is necessary to use high density polyethylene (HDPE) to provide sufficient stiffness in the cap.

EP 1 146 077 A describes a bimodal HDPE composition for producing moulded articles with increased E-modulus and high ESCR which comprises an ethylene homopolymer or an ethylene alpha-olefin copolymer comprising
i) a low molecular weight ethylene homopolymer or copolymer and
ii) a high molecular weight ethylene homopolymer or copolymer and a nucleating agent.

According to EP 1 146 077 A the most effective nucleating agents are those containing an organic group and a polar group and which are insoluble in the HDPE, such as mono- or polycarboxylic aromatic acids or salts thereof, whereby a particularly effective nucleating agent is sodium benzoate.

EP 1 278 797 A describes a polyolefin composition suitable for producing bottle caps by injection moulding which comprises a polyethylene with a density of more than 940 kg/m$^3$ and at least one saturated fatty acid amid containing 8 to 30 carbon atoms. Preferably this saturated fatty acid amid is behenamide.

It is known in the state of the art that addition of such fatty acid amides reduces the coefficient of friction, respectively the friction between a first article manufactured from a polyolefin and another article which is in contact with the first, in particular to avoid friction between a polyolefin cap and a bottle, in order to facilitate the unscrewing of the cap.

As stated above the use of multimodal polyethylene in the manufacture of injection moulded articles is known.

Injection moulding may be used to make a wide variety of articles including articles having relatively complex shapes and a range of sizes. Injection moulding is, for instance, suited to the manufacture of articles used as caps and closures for food and drink applications, such as for bottles containing carbonated or non-carbonated drinks, or for non-food applications like containers for cosmetics and pharmaceuticals.

The injection moulding cycle may be decomposed into three stages: filling, packing-holding and cooling. In order to improve process efficiency it is aimed for a reduction of production cycle time. Cycle time reduction can be achieved in part by inducing in the resin a higher $T_c$ (crystallization temperature), which enables the molten resin to harden at higher temperature. This decreases the necessary cooling time and facilitates ejection of the article from the mould at a faster rate.

From WO 2005/103132 it is known that the use of talc as nucleating agent for linear low density polyethylene causes an increase in crystallisation temperature, which thus further leads to the desired decrease in cycle time.

Although much development work has been done in the field of polyethylene, there still remains a need for improved polyethylene compositions suitable for use in injection moulding, in particular for caps and closures, which reduces both, the cycle time of the injection moulding process and the coefficient of friction even more compared to polyethylene compositions known from the state of the art.

It has now been found that by using bimodal HDPE in combination with talc as nucleating agent and behenamide as slip agent there may be obtained an HDPE moulding composition with unexpected and synergistic effects on the crystallization temperature and coefficient of friction of the composition.

Accordingly, the present invention provides in a first embodiment a bimodal high density polyethylene composition for producing moulded articles comprising
a) 92.6 to 99.4 wt % of the composition of a bimodal high density polymer comprising an ethylene homopolymer or an ethylene alpha-olefin copolymer (COMPONENT A) in combination with
b) 0.5 to 2 wt % of the composition of an alpha nucleating agent (COMPONENT B),
c) 0.05 to 0.4 wt % of the composition of a slip agent being a primary fatty acid amide, (COMPONENT C) and
d) 0.05 to 5 wt % of the composition of one or more additives selected from antioxidants, acid scavengers, pigments and UV-stabilisers. (COMPONENT D)

Component A:

The composition according to the invention which is a bimodal high density polymer thus comprises as first Component A an ethylene homopolymer or an ethylene alpha-olefin copolymer, comprising
i) a low molecular weight ethylene homopolymer or copolymer and
ii) a high molecular weight ethylene homopolymer or copolymer.

Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The alpha-olefin of the aforesaid ethylene alpha-olefin copolymer is suitably selected from propylene, 1-butene, 1-pentene, 1-hexene, 4-methyl-1-pentene, 1-octene, 1-decene and cyclic olefins, its content being typically between 0.1 and 10 weight %.

Preferred copolymers are 1-butene and 1-hexene, most preferred 1-butene. The content of the copolymer is preferably between 0.2 and 1.0 wt %.

Fractions (i) and (ii) both may be ethylene copolymers or ethylene homopolymers, although preferably at least one of the fractions is an ethylene copolymer.

Preferably, the Component A comprises an ethylene homopolymer and an ethylene copolymer Component.

Where one of the Components is an ethylene homopolymer, this is preferably the Component with the lower weight average molecular weight (Mw), i.e. fraction (i).

The low molecular weight fraction (i) preferably has an $MFR_2$ of 10 g/10 min or higher, more preferably of 50 g/10 min or higher, and most preferably of 100 g/10 min or higher.

Furthermore, fraction (i) preferably, has an $MFR_2$ of 1000 g/10 min or lower, preferably 800 g/10 min or lower, and most preferably 600 g/10 min or lower.

Most preferably the low molecular weight fraction (i) has an $MFR_2$ in the range of 300 to 500 g/10 min.

Preferably, fraction (i) is an ethylene homopolymer with a density of more than 960 kg/m$^3$ more preferably more than 960 kg/m$^3$ to 980 kg/m$^3$, still more preferably 965 kg/m$^3$ to 975 kg/m$^3$.

The ethylene homopolymer may contain trace amounts of contaminate comonomers, e.g. alpha-olefin comonomers. The term ethylene homopolymer, as used herein, refers to an ethylene polymer containing at least 99 percent by weight of ethylene units.

The higher molecular weight fraction (ii) preferably is an ethylene homo- or copolymer with a density and a $MFR_2$ lower than for fraction (i). The $MFR_2$ and the density are such that the final Component A has the desired properties as described below in detail.

Most preferably, fraction (ii) is a copolymer.

Further preferred, the weight ratio of fraction (i) to fraction (ii) in Component A is in the range 30:70 to 70:30, more preferably 35:65 to 65:35, most preferably 40:60 to 60:40.

Where herein features of fractions (i) and/or (ii) of the composition of the present invention are given, these values are generally valid for the cases in which they can be directly measured on the respective fraction, e.g. when the fraction is separately produced or produced in the first stage of a multistage process.

However, the composition may also be and preferably is produced in a multistage process wherein e.g. fractions (i) and (ii) are produced in subsequent stages. In such a case, the properties of the fractions produced in the second step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

Component A is, as stated above, a bimodal HDPE.

The density of Component A preferably is 930 kg/m$^3$ or more, more preferably is 940 kg/m$^3$ or more, still more preferably is 945 kg/m$^3$ or more, even more preferably is 950 kg/m$^3$ or more, and most preferably is 952 kg/m$^3$ or more.

Furthermore, the density of Component A preferably is 980 kg/m$^3$ or lower, more preferably is 975 kg/m$^3$ or lower, still more preferably is 965 kg/m$^3$ or lower and most preferably is 960 kg/m$^3$ or lower.

Thus the high density polyethylene Component A preferably has a density in the range of 945 to 975 kg/m$^3$ and more preferably of 952 to 960 kg/m$^3$.

Component A preferably has an $MFR_2$ of 0.3 g/10 min or more, more preferably of 0.5 g/10 min or more and most preferably of 0.8 g/10 min or more.

Further, Component A preferably has an $MFR_2$ of 25 g/10 min or below, more preferably of 15 g/10 min or below, still more preferably of 5 g/10 min or below and most preferably of 2 g/10 min or below.

Thus the high density polyethylene Component A preferably has a $MFR_2$ in the range of 0.5 to 5 g/10 min and more preferably of 0.8 to 2 g/10 min.

The polyethylene Component A preferably has a molecular weight distribution MWD, being the ratio of the weight average molecular weight $M_w$ and the number average molecular weight $M_n$, of 10 or more, more preferably of 15 or more, still more preferably of 17 or more, still more preferably of 20 or more, and most preferably of 22 or more.

Furthermore, Component A has an MWD of 60 or below, more preferably of 40 or below still more preferably of 35 or below and most preferably of 30 or below.

Thus the high density Component A preferably has an MWD in the range of 10 to 35 and more preferably of 15 to 30.

Different polymerisation reactions and catalyst systems may be employed to produce the high-density polyethylene Component A.

The polymerisation catalysts include coordination catalysts of a transition metal, such as Ziegler-Natta (ZN), metallocenes, non-metallocens, Cr-catalysts etc.

In a preferred embodiment the bimodal HDPE polymer is prepared using a Ziegler Natta (ZN) catalyst, e.g. a conventional ZN catalyst.

Preferred Ziegler-Natta catalysts comprise a transition metal Component and an activator. The transition metal Component comprises a metal of Group 4 or 5 of the Periodic System (IUPAC) as an active metal. In addition, it may contain other metals or elements, like elements of Groups 2, 13 and 17. Preferably, the transition metal Component is a solid. More preferably, it has been supported on a support material, such as inorganic oxide carrier or magnesium halide. Examples of such catalysts are given, among others in WO 95/35323, WO 01/55230, EP 0 810 235; EP 0 688 794 and WO 99/51646.

In one embodiment a catalyst of Ziegler Natta type, wherein the active Components are dispersed and solidified within a Mg-based support by an emulsion/solidification method adapted for polyethylene catalysts, e.g. as disclosed in WO 03/106510 of Borealis is used, e.g. according to the principles given in the claims thereof.

In another preferable embodiment, the catalyst is a non-silica supported catalyst, i.e. the active Components are not supported on an external silica support. Preferably, the support material of the catalyst is a Mg-based support material. Examples of such preferred Ziegler-Natta catalysts are described in EP 0 810 235.

In yet another preferable embodiment of the invention the polyethylene composition is produced using a ZN catalyst disclosed in EP 688794.

Conventional cocatalysts, supports, carriers, electron donors may also be used.

The manner in which the high density polyethylene Component A of the invention is produced is not critical to the present invention. Component A can be produced by mechanical blending of the individual fractions (i) and (ii), by reactor or in-situ blending, by combinations of these two processes or other means which achieve proper homogenization.

For example, the composition can be prepared by mechanical blending of the two fractions in the desired amount, e.g. using a conventional compounding or blending apparatus, like a Banbury mixer, a 2-roll rubber mill, Buss-co-kneader or a twin screw extruder.

Fractions (i) and (ii) used for mechanical blending are prepared separately with any conventional ethylene homo-respectively co-polymerisation method, e.g. in gas phase, slurry phase, liquid (bulk) phase using conventional reactors, such as loop reactor, gas phase reactor, semi-batch or batch reactor, in the presence of a polymerisation catalyst.

The composition can also be produced by in-situ blending of fractions (i) and (ii). By in-situ blending, production of a bimodal polymer is meant wherein the fractions are produced either simultaneously in one reaction stage (e.g. by using different catalysts) and/or are produced in a two-stage process.

A two-stage process is defined to be a polymerisation process in which a polymer comprising two fractions is produced by producing each fraction in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions.

Such conventional ethylene homopolymerisation or copolymerisation reactions include, but are not limited to, gas phase polymerisation, slurry phase polymerisation, liquid phase polymerisation, and combinations thereof using conventional reactors, e.g. gas phase reactors, loop reactors, stirred tank reactors, and batch reactors in series, or in series and parallel. The polymerisation system used in the instant invention is preferably a dual sequential polymerisation system. Examples of dual sequential polymerisation system include, but are not limited to, gas phase polymerisation/gas phase polymerisation; gas phase polymerisation/liquid phase polymerisation; liquid phase polymerisation/gas phase polymerisation; liquid phase polymerisation/liquid phase polymerisation; slurry phase polymerisation/slurry phase polymerisation; liquid phase polymerisation/slurry phase polymerisation; slurry phase polymerisation/liquid phase polymerisation; slurry phase polymerisation/gas phase polymerisation; and gas phase polymerisation/slurry phase polymerisation.

Preferred dual sequential polymerisation systems are liquid phase polymerisation/liquid phase polymerisation, slurry phase polymerisation/slurry phase polymerisation, gas phase polymerisation/gas phase polymerisation or slurry phase polymerisation/gas phase polymerisation.

The first Component, i.e. the low molecular weight ethylene polymer (fraction (i)), can be produced in the first stage of the dual sequential polymerisation system, and the second Component, i.e. the high molecular weight ethylene polymer (fraction (ii)), can be prepared in the second stage of the dual sequential polymerisation system. Alternatively, the second Component, i.e. the high molecular weight ethylene polymer (fraction (ii)), can be made in the first stage of the dual sequential polymerisation system, and the first Component, i.e. the low molecular weight ethylene polymer (fraction (i)), can be made in the second stage of the dual sequential polymerisation system.

For purposes of the present disclosure, the reactor, in which the conditions are conducive to making the first Component, is known as the first reactor. Alternatively, the reactor in which the conditions are conducive to making the second Component is known as the second reactor.

Preferably, the main polymerisation stages of the multistage process for producing the composition according to the invention are such as described in EP 517 868, i.e. the production of fractions (i) and (ii) is carried out as a combination of slurry polymerisation for fraction (i)/gas-phase polymerisation for fraction (ii). The slurry polymerisation is preferably performed in a so-called loop reactor. Further preferred, the slurry polymerisation stage precedes the gas phase stage. Such multistage process is known under the name Borstar® PE process.

A further preferred multistage process for producing the composition according to the invention is the dual slurry tank process of Mitsui CX or Hostalen.

Optionally and advantageously, the main polymerisation stages may be preceded by a prepolymerisation, in which case up to 20% by weight, preferably 1 to 10% by weight, more preferably 1 to 5% by weight, of the total composition is produced. The prepolymer is preferably an ethylene homopolymer (High Density PE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end.

The resulting end product consists of an intimate mixture of the polymers from the two main reactors, the different molecular-weight-distribution curves of these polymers together forming a molecular-weight-distribution curve having a broad maximum, i.e. the end product is a bimodal polymer mixture.

It is preferred that the base resin, i.e. the entirety of all polymeric constituents, of the composition according to the invention is a bimodal polyethylene mixture consisting of fractions (i) and (ii), optionally further comprising a small prepolymerisation fraction in the amount as described above.

It is also preferred that this bimodal polymer mixture has been produced by polymerisation as described above under different polymerisation conditions in two polymerisation reactors connected in series. Owing to the flexibility with respect to reaction conditions thus obtained, it is most preferred that the polymerisation is carried out in a loop reactor/a gas-phase reactor combination or in a stirred slurry tank/stirred slurry tank combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

Component A can be first compounded with Component D.

This composition is defined as Component A'.

Composition A' has an environmental stress crack resistance ESCR (ASTM D-1693, Condition B, 10% Igepal), of 40 h or more, preferably 60 h or more, more preferably of 80 h or more, still more preferably of 100 h or more, and most preferably of 200 h or more.

The ESCR of Composition A' can be up to 300 h or even up to 400 h.

Preferably the ESCR of Composition A' is in the range of 100 h to 400 h, preferably of 200 to 300 h.

Preferably, Component A' of the invention has a tensile modulus of at least 800 MPa, more preferably at least 825 MPa, more preferably at least 850 MPa and most preferably at least 900 MPa.

Typically, an upper limit for the tensile modulus is 1000 MPa or even 1200 MPa.

A typical range for the tensile modulus is 850 to 1200 MPa, preferably 900 to 1000 MPa.

Preferably, Component A' of the invention has a notched Charpy impact strength (23° C.) of 4 kJ/m$^2$ or more, more preferably 5 kJ/m$^2$ or more, still more preferably 7 kJ/m$^2$ or more and most preferably 8 kJ/m$^2$ or more.

Further Component A' has a notched Charpy impact strength (23° C.) of up to 15 kJ/m$^2$ or even up to 20 kJ/m$^2$.

Preferably Component A' has a notched Charpy impact strength (23° C.) in the range of 7 to 20 kJ/m$^3$, preferably in the range of 8 to 15 kJ/m$^2$.

In addition Component A' has a notched Charpy impact strength (−20° C.) of 2 kJ/m$^2$ or more, more preferably of 2.5 kJ/m$^2$ or more, still more preferably of 3 kJ/m$^2$ or more and most preferably of 3.5 kJ/m$^2$ or more.

Component A' has a notched Charpy impact strength (−20° C.) of up to 8 kJ/m2, more preferably of up to 10 kJ/m2.

Preferably Component A' has a notched Charpy impact strength (−20° C.) in the range of 3 to 10 kJ/m$^3$, preferably in the range of 3.5 to 8 kJ/m$^2$.

Component B

The composition of the invention further contains an alpha nucleating agent.

Examples of suitable alpha-nucleating agents are inorganic additives such as talc, silica or kaolin;

salts of monocarboxylic or polycarboxylic acids, e.g. sodium benzoate or aluminum tertbutylbenzoate;

dibenzylidenesorbitol or its $C_1$-$C_8$-alkyl-substituted derivatives such as methyldibenzylidenesorbitol, ethyldibenzylidenesorbitol or dimethyldibenzylidenesorbitol;

salts of diesters of phosphoric acid, e.g. sodium 2,2'-methylenebis (4,6,-di-tertbutylphenyl) phosphate or aluminium-hydroxy-bis[2,2'-methylene-bis(4,6-di-tbutylphenyl)phosphate;

nonitol derivatives like 1,2,3-trideoxy-4,6:5,7-bis-O[(4-propylphenyl)methylene]-nonitol or vinylcycloalkane polymer and vinylalkane polymer Preferred alpha-nucleating agents are inorganic nucleating agents, more preferably talc is used as nucleating agent.

Different types of talc can be used, like talc with a high aspect ratio, finely powdered talc and compacted talc or mixtures therefrom.

Before compounding the talc used has a particle size d95 of 50 micrometer or less, preferably 25 micrometer or less and most preferably 15 micrometer or less measured by laser diffraction according to ISO 13320-1:1999.

Preferably, the particle size d95 before compounding of Component (B) preferably is not less than 1 micrometer, more preferably not less than 2 micrometers measured by laser diffraction according to ISO 13320-1:1999.

Furthermore the mean particle size d50 may be chosen between 0.5 to 40 µm, preferably between 0.7 to 20 µm and more preferably between 1.0 to 10 µm measured by laser diffraction according to ISO 13320-1:1999

The mean (or median) particle size is the particle diameter where 50% of the particles are larger and 50% are smaller. It is denoted as the d50 or $D_{50}$.

Preferably, the talc has a specific surface (BET) before compounding of at least 5.0 m$^2$/g, more preferably of at least 7.0 m$^2$/g and most preferably of at least 9.0 m$^2$/g, determined according to DIN 66131/2. Said surface area will usually not be higher than 100.0 m$^2$/g.

Preferably, the talc has an average aspect ratio before compounding, defined as the ratio between the biggest and the smallest average dimensions of the talc before compounding the polypropylene composition, of at least 5.0, even more preferably of at least 7.5 and most preferably of at least 10.0. Usually the average aspect ratio will not be higher than 50.0.

The average aspect ratio is measured according to the method defined in detail in the experimental part Before the talc is added it may be treated with various surface treatment agents, such as organic titanate coupling agents, silane coupling agents, fatty acids, metal salts of fatty acids, fatty acid esters, and the like, in a manner known in the state of the art. The talc may also be added without surface treatment.

Preferably the talc is added without surface treatment.

Examples for suitable commercially available talcs are Tital 15 (Ankerport), Tital 10 (Ankerport), Luzenac A7 (Luzenac), Jetfine 3CA (Lucenac, Rio Tinto), HAR T84 (Lucenac, Rio Tinto), e.t.c Component C The composition of the invention further contains a slip agent, which is in case of the present invention of a primary fatty acid amide.

Preferably the primary fatty acid amide is selected from linear saturated fatty acid amides containing 10 to 25 carbon atoms, and mixtures thereof.

Accordingly the slip agent is preferably selected from the group consisting of cis-13-docosenoic amide or erucamide (CAS no. 112-84-5; 337.6 g/mol), cis-9-octadecenoamide or oleamide (CAS no. 301-02-0; 281.5 g/mol)

octadecanoylamide or stearamide (CAS no. 124-26-5; 283.5 g/mol), docosanamide or behenamide (CAS no. 3061-75-4; 339.5 g/mol), N,N'-ethylene-bis-stearamide (CAS no. 110-30-5; 588 g/mol), N-octadecyl-13-docosenamide (CAS no. 10094-45-8; 590 g/mol), and oleylpalmitamide (CAS no. 16260-09-6; 503 g/mol).

Especially preferred are behenamide and/or erucamide; more preferably behenamide is used.

Component D

The composition according to the present invention further contains one or more additives selected from antioxidants, acid scavengers, pigments and UV-stabilisers.

Preferably as Component D an antioxidant and/or an acid scavenger is used.

Antioxidants (AO) can be selected from the group of sterically hindered phenols, phosphites/phosphonites, sulphur containing AO Lactone, aromatic amines Hindered amine stabilisers (mainly known as UV-stabilisers), HAS or blends therefrom.

Antioxidants, such as Irgafos® 168, Irganox® 1010 or Doverphos® S-9228, are commonly used to protect the polymer from thermal and/or oxidative degradation. Irganox® 1010 is tetrakis (methylene (3,5-di-tert-butyl-4-hydroxyhydrocinnamate), which is commercially available from Ciba Geigy Inc. Irgafos® 168 is tris(2,4 di-tert-butylphenyl) phosphite, which is commercially available from Ciba Geigy Inc.

Doverphos® S-9228 is Bis(2,4-dicumylphenyl)pentaerythritol diphosphite, which is commercially available from Dover Chemicals.

Examples for suitable acid scavengers can be selected from the group of Ca-stearate, Calcium 12-hydroxy stearate, Sodium-stearate, Zinc-stearate, Magnesiumoxide, Zincoxide, Synthetic hydrotalcite, e.t.c.

Preferably Calcium-stearate is used as acid scavenger.

High Density Polyethylene Composition

The high density polyethylene composition according to the present invention comprises in addition to Component A and Component D, Component B and Component C.

Thus the high density polyethylene composition according to the present invention comprises as Component A a bimodal high density Component, as Component B an alpha-nucleating agent, as Component C a slip agent and as Component D one or more additives selected from antioxidants, acid scavengers, pigments and UV-stabilisers; the Components being defined in more detail in the description above.

Preferably the high density polyethylene composition according to the present invention comprises as Component A a bimodal high density Component, as Component B talc, as Component C behenamide and as Component D an antioxidant in combination with an acid scavenger.

Component A is present in an amount of 92.6 to 99.4 wt % of the composition;

Component B is present in an amount of 0.5 to 2 wt %, preferably 0.6 to 1.8 wt %, more preferably 0.7 to 1.7 wt % and most preferably 0.8 to 1.5 wt % of the composition, Component C is present in an amount of 0.05 to 0.4 wt %, preferably 0.06 to 0.3 wt % and more preferably 0.07 to 0.25 wt % and Component D is present in an amount of 0.05 to 5 wt %, preferably 0.06 to 4 wt %, more preferably 0.07 to 3 wt % of the composition; whereby the amount of each added additive is preferably in the range of 0.05 to 0.2 wt % and more preferably in the range of 0.07 to 0.1 wt %.

In the production of the composition of the present invention, preferably a compounding step is applied, wherein Component A, being the base resin, i.e. the blend, which is typically obtained as a base resin powder from the reactor, is extruded in an extruder and then pelletized to polymer pellets in a manner known in the art.

Preferably, the additives, including Components B), C) and D) are mixed into the base resin prior to or during the extrusion process in a one-step compounding process. Alternatively, a master batch may be formulated, wherein the base resin is first mixed with only some of the additives.

Preferably, Component A of the invention obtained from the reactor is compounded in the extruder together with the additives in a manner known in the art.

The extruder may be e.g. any conventionally used extruder. As an example of an extruder for the present compounding step may be those as supplied by Japan steel works, Kobe steel or Farrel-Pomini, e.g. JSW 460P.

The polymer materials recovered from the extruder are usually in the form of pellets. These pellets are then preferably further processed by injection moulding to generate articles and products of the thermoplastic polyolefin compounds according to the present invention.

Advantage

The composition of the invention comprises a bimodal HDPE, an alpha nucleating agent, preferably talc and a slip agent, preferably behenamide. This combination shows unexpected and synergistic effects on the crystallization temperature and coefficient of friction of the composition.

It is known in the art that the crystallisation temperature of polyolefins in general can be increased by adding nucleating agents. Moreover the increase of crystallisation temperature makes it possible to reduce the process time (cycle time) in manufacturing finished articles from the molten polymer.

As described in WO 2005/103132 it is known that the use of talc as nucleating agent in linear low density polyethylene has been found to cause an increase in crystallisation temperature.

Surprisingly the use of the combination of a nucleating agent and a slip agent, preferably the combination of talc and behenamide has now been found to cause a significant higher increase in the crystallisation temperature compared to the sole use of nucleating agent, especially talc and compared to the sole use of a slip agent, especially behenamide.

Thus a further embodiment of the present invention is the use of the combination of a nucleating agent, especially talc and a slip agent, especially behenamide for increasing the crystallisation temperature of a bimodal HDPE by at least 2° C., preferably at least 2.5° C.

Furthermore it is known that by adding a slip agent the coefficient of friction (COF) can be reduced in order to optimize the slip properties of polymer compositions and thus to facilitate the unscrewing of a cap.

Surprisingly the use of the combination of a nucleating agent, especially talc and a slip agent, especially behenamide has now been found to cause a significant decrease of the COF compared to the sole use of nucleating agent, especially talc and compared to the sole use of a slip agent, especially behenamide.

The COF of a material is the measure of the sliding resistance of a material over another material.

Friction is measured according to ISO 8295 and is by definition the resistance that two surfaces being in contact with each other build up against sliding. A distinction is made between Static friction which has to be overcome at the moment of sliding motion and Dynamic friction which persist during sliding motion at given speed.

Thus a further embodiment of the present invention is the use of the combination of a nucleating agent, especially talc and a slip agent, especially behenamide for preparing a bimodal HDPE composition with a decreased coefficient of friction compared to bimodal HDPE composition prepared with the sole use of nucleating agent, especially talc and compared to the sole use of a slip agent, especially behenamide.

Use

In application, the inventive high density polyethylene composition may be used to manufacture shaped articles.

Still further, the present invention relates to injection moulded articles, preferably to caps or closures, comprising a polyethylene composition as described above and to the use of such a polyethylene composition for the production of an injection moulded article, preferably a cap or closure.

Injection moulding of the composition hereinbefore described may be carried out using any conventional injection moulding equipment. A typical injection moulding process may be carried out a temperature of 190 to 275° C.

In injection moulding process, the inventive high density polyethylene composition is fed into an extruder via a hopper. The extruder conveys, heats, melts, and pressurizes the inventive high density polyethylene composition to a form a molten stream. The molten stream is forced out of the extruder through a nozzle into a relatively cool mould held closed under pressure thereby filling the mould. The melt cools and hardens until fully set-up. The mould then opens and the moulded article, e.g. bottle cap, is removed. The injection moulded cap may include a skirt that axially extends from the periphery of a base, and may further include internal threads for securing the cap to a container.

Closure devices, e.g. bottle caps, including the inventive high density polyethylene composition show improved crystallisation temperature, which allows a reduction of the production cycle and decreased coefficient of friction, which simplifies the opening of the bottle.

Such bottle caps are adapted to withstand the pressure of carbonated drinks. Such bottle caps further facilitate closure, and sealing of a bottle, i.e. optimum torque provided by a machine to screw the cap on the bottle, or unsealing a bottle, i.e. optimum torque provide by a person to unscrew the cap.

The invention further comprehends the use of a bimodal HDPE composition comprising Component A being a bimodal HDPE comprising i) a low molecular weight ethylene homopolymer or copolymer;
ii) a high molecular weight ethylene homopolymer or copolymer; and Component B, a nucleating agent, preferably talc;
Component C, a slip agent, preferably behenamide and
Component D, comprising one or more additives selected from antioxidants, acid scavengers, pigments and UV-stabilisers, for producing moulded articles with increased crystallisation temperature and decreased COF.

EXPERIMENTAL AND EXAMPLES

1. Definitions and Measurement Methods a) Molecular Weight Distribution

The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Howings constant K: 9.54*10-5 and a: 0.725 for PS, and K: 3.92*10-4 and a: 0.725 for PE). The ratio of Mw and Mn is a measure of the broadness of the distribution, since each is influenced by the opposite end of the "population".

The molecular weight distributions of ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040.

The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 Pm columns and one Shodex HT803M 150 mm, 12 Pm column. The solvent used was 1,2,4 trichlorobenzene. The samples were prepared at a concentration of 0.1 grams of polymer in 50 milliliters of solvent. The chromatographic solvent and the sample preparation solvent contained 200 P/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight Component, to minimize degradation. The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, Chromatography Polym. Chpt 12, (1992) and Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing 2nd Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline subtracted light scattering signal can be substituted for the product of weight average molecular weight and weight fraction in equation (2) below:

$$a)\ \overline{Mn} = \frac{\sum_i Wf_i}{\sum_i (Wf_i / M_i)} \qquad (2)$$

-continued b) $\overline{Mw} = \dfrac{\sum_i (Wf_i * M_i)}{\sum_i Wf_i}$ c) $\overline{Mz} = \dfrac{\sum_i (Wf_i * M_i^2)}{\sum_i (Wf_i * M_i)}$.

b) Density

All densities are measured according to ISO 1183-187. Sample preparation is done by compression moulding in accordance with ISO 1872-2:2007.

c) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg (MFR$_2$), 5 kg (MFR$_5$) or 21.6 kg (MFR$_{21}$).

d) Charpy Notched Impact Strength

Charpy notched impact strength was determined according to ISO 179:2000 on V-notched samples (80×10×4 mm$^3$, dog bone) at 23° C. (Charpy impact strength (23° C.)) and −20° C. (Charpy impact strength (−20° C.)).

e) Environmental Stress Crack Resistance (ESCR)

ESCR was determined according to ASTM 1693, condition B at 50° C. and using 10% Igepal co-630.

f) Tensile Properties

Tensile properties were measured on injection moulded samples according to ISO 527-2:1993. Tensile modulus was measured at a speed of 1 mm/min.

g) COF measured according to ISO 8295 h) Crystallisation Temperature

The melting temperature Tm, crystallisation temperature Tc and degree of crystallinity are measured according to ISO 11357-3:1999 with a Mettler TA820 differential scanning calorimetry device (DSC) on 3±0.5 mg samples. Crystallisation and melting temperatures are obtained during 10° C./min cooling and heating scans between 30° C. and 225° C. Melting and crystallisation temperatures were taken as the peaks of the endotherms and exotherms.

i) Comonomer content of the obtained products was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm$^{-1}$. The comonomer used in the calibration samples was the same as the comonomer present in the samples. The analysis was performed by using the resolution of 2 cm$^{-1}$, wave number span of from 4000 to 400 cm$^{-1}$ and the number of sweeps of 128. At least two spectra were run from each film.

The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

j) Particle Size (Talc Before Compounding)

The particle sizes d50 and d95 are calculated from the particle size distribution measured by laser diffraction according to ISO 13320-1:1999.

k) Specific Surface of Talc

The specific surface of the talc is determined according to DIN 66131/2.

l) Average Aspect Ratio of Talc

The average aspect ratio has been determined by recording transmission electron microscopy (TEM) images of the pure inorganic filler prepared onto film-coated TEM grids from an aqueous suspension by rotating the sample in 1° intervals from −75° to +75°, e.g. with JEOL JEM-2100 microscope, and reconstructing the three dimensional structure (e.g. with the JEOL TEMography™ software). 100 particles were measured and the average calculated. The aspect ratio of a particle is the ratio of the longest and shortest particle radii that pass through the geometric centre of the particle.

2. Examples

General Protocol

The first stage of the polymerisations below was carried out in a 500 dm$^3$ loop reactor in the presence of ethylene, propane and hydrogen in the amounts specified in table 2. The polymer containing active catalyst was separated from the reaction medium and transferred to a gas phase reactor operated at 20 bar pressure where additional ethylene, hydrogen and comonomer were added (Table 3).

The catalyst used was that of Example 3 of EP-B-0 688 794 (loaded on 20 micron silica) with triethyl aluminium as cocatalyst.

Catalyst Preparation:

Complex Formation: 87 kg toluene was added to a reactor. Then 45.5 kg 20.3% BOMAG-A in heptane was added in the reactor. 161 kg 99.8% 2-ethyl-1-hexanol was fed in the reactor at the speed of 24-40 kg/h. The molar ratio between BOMAG-A and 2-ethyl-1-hexanol was 1:1.83.

275 kg silica (Grace 955) activated at 600° C. was charged into a reactor. 411 kg 20% EADC (2.0 mmol/g Si) diluted in 555 l pentane was added to the reactor at ambient temperature during 1 h. The temperature was increased to 35° C. The treated silica was stirred for 1 h. The treated silica was dried at 50° C. for 8.5 h. 655 kg of the complex (2 mmol Mg/g Si) prepared above was added at 23° C. during 10 min. 86 kg pentane was added into the reactor at 22° C. during 10 min. The slurry was stirred for 8 h at 50° C. Finally 52 kg TiCl$_4$ was added during 0.5 h at 45° C. The slurry was stirred at 40° C. for 5 h. The catalyst was dried under nitrogen purge. The composition of the dry catalyst was 2.4% Ti, 2.3% Mg, 14.1% Cl and 2.9% Al.

The catalyst was prepolymerised using the following conditions.

TABLE 1

Prepolymerisation Conditions:

| | | |
|---|---|---|
| Temperature | ° C. | 70 |
| Pressure | bar | 63 |
| $C_2$-feed | kg/h | 2 |
| $C_3$-feed | kg/h | 43 |
| $H_2$-feed | g/h | 5.2 |
| Catalyst-feed | g/h | 14 |

TABLE 2

Polymerisation Conditions: Loop reactor

| | | |
|---|---|---|
| Temperature | ° C. | 95 |
| Pressure | bar | 58 |
| Cat-feed | g/h | 14.0 |
| Cocat-feed | g/h | 6.0 |
| $C_2$-feed | kg/h | 44.4 |
| $C_3$-feed | kg/h | 88.7 |
| $H_2$-feed | g/h | 132 |
| [$C_2$] | mol % | 6.8 |
| $H_2/C_2$-ratio | mol/kmol | 347 |
| Split | % | 52 |
| $MFR_2$ | g/10 min | 400 |
| Density | kg/m³ | >965 |

TABLE 3

Polymerisation Conditions: Gas phase reactor

| | | |
|---|---|---|
| Temperature | ° C. | 85 |
| Pressure | bar | 20 |
| $C_2$-feed | kg/h | 43 |
| $C_4$-feed | kg/h | 1.6 |
| $H_2$-feed | g/h | 15.1 |
| [$C_2$] | mol % | 8.8 |
| $C_2$ partial pressure | bar | 1.8 |
| $H_2/C_2$-ratio | mol/kmol | 81 |
| $C_4/C_2$ ratio | mol/kmol | 80 |
| Split | % | 48 |
| $MFR_2$ | g/10 min | 1.5 |
| Density | kg/m³ | 954 |

To the product (Component A) was added 750 ppm Doverphos S-9228 (AO) and 750 ppm Ca-Stearate (AS). (=Reference material; Component A')

Pellets of the above polymer powder (Reference material, corresponding to Component A') were mixed with the nucleating agent and the slip agent on a small scale 24 mm twin-screw Prism extruder with a maximum temperature of 190° C.

As nucleating agent HAR T84 (talc from Luzenac, Rio Tinto) and as slip agent behenamide (Finawax B from Fine Organics)

The inventive composition consisted of 98.9 wt % of Component A', 1 wt % of talc and 0.1 wt % of behenamide.

As comparative examples the reference material corresponding to Component A' (CEX1), CEX2: 99 wt % reference material mixed with 1 wt % talc and CEX3: 99.9 wt % reference material and 0.1 wt % of behenamide were used.

The crystallization temperature of the inventive composition (IEX1), CEX1, CEX2 and CEX3 were measured with DSC as described above. The results can be seen from Table 4:

TABLE 4

| Example | Composition | Crystallisation Temperature [° C.] | Tensile Modulus (MPa) |
|---|---|---|---|
| Reference material (CEX1) | Component A (HDPE) + Component D (AO + AS) | 117.5 | 900 |
| CEX2 | 99 wt % Reference material + 1 wt % Component B (talc) | 118.4 | 957 |
| CEX3 | 99.9 wt % Reference material + 0.1 wt % Component C (behenamide) | 118.8 | 905 |
| Inventive Composition (IEX1) | 98.9 wt % Reference material + 1 wt % Component B (talc) + 0.1 wt % Component C (behenamide) | 120.2 | 950 |

As can be seen easily from Table 4 the combination of talc and behenamide has a surprising synergistic effect on the crystallization temperature of the HDPE.

The coefficient of friction was measured according to ISO 8295 as described above.

The samples were tested on a universal testing machine: Zwick Z2.5 with a load cell of 10N.

Injection moulded plates (60×60×2 mm) were mounted directly on the sledge of 200 g. The contact area was 40 cm², the testing speed was 100 mm/min.

5 parallel samples were done in order to lower the standard deviation.

The results can be seen from Table 5:

TABLE 5

| | Coefficient of Friction | | | |
|---|---|---|---|---|
| | Inside | | Outside | |
| Example | Static | Dynamic | Static | Dynamic |
| CEX1 | 0.85 | 0.56 | 0.35 | 0.30 |
| CEX2 | 0.60 | 0.45 | 0.36 | 0.26 |
| CEX3 | 0.51 | 0.35 | 0.34 | 0.24 |
| IEX1 | 0.60 | 0.34 | 0.30 | 0.20 |

As can be seen easily from Table 5 the combination of talc and behenamide has a surprising synergistic effect on the COF of the HDPE.

The invention claimed is:

1. Bimodal high density polyethylene composition for producing moulded articles comprising:
    a) 92.6 to 99.4 wt % of the composition of a bimodal high density polymer comprising an ethylene homopolymer or an ethylene alpha-olefin copolymer (COMPONENT A) in combination with;
    b) 0.5 to 2 wt % of the composition of talc, (COMPONENT B);
    c) 0.05 to 0.4 wt % of the composition of a slip agent being behenamide, (COMPONENT C) and;
    d) 0.05 to 5 wt % of the composition of one or more additives selected from antioxidants, acid scavengers, pigments and UV-stabilisers. (COMPONENT D).
2. High density polyethylene composition according to claim 1, wherein Component A comprises:
    (i) a low molecular weight ethylene homopolymer or copolymer and;

(ii) a high molecular weight ethylene homopolymer or copolymer.

3. High density polyethylene composition according to claim 2, wherein the low molecular fraction (i) of Component (A) is an ethylene homopolymer with an $MFR_2$ in the range of 300 to 500 g/10 min and a density of more than 960 to 980 kg/m$^3$ and the high molecular weight fraction (ii) of Component (A) is an ethylene copolymer with an alpha-olefin comonomer selected from 1-butene or 1-hexene and wherein the weight ratio of fraction (i) to fraction (ii) is in the range of 40:60 to 60:40.

4. High density polyethylene composition according to claim 2, wherein Component (A) is prepared in a two-step process comprising a first slurry polymerisation step for producing the low molecular weight fraction (i) and a second gas phase polymerisation step for producing the high molecular weight fraction (ii), wherein the second polymerisation step is carried out in the presence of the polymerisation product of the first step and wherein the first polymerisation step may be preceded by a prepolymerisation step.

5. High density polyethylene composition according to claim 1, wherein Component D is an antioxidant and/or an acid scavenger.

6. High density polyethylene composition according to claim 1, wherein Component (A) is a bimodal high density polymer composed of a low molecular weight ethylene homopolymer and a high molecular weight ethylene/1-butene copolymer and Component D is an antioxidant and/or an acid scavenger.

7. Injection moulded articles comprising the HDPE composition according to claim 1.

8. The injection moulded article according to claim 7, wherein the article is a cap or closure.

9. High density polyethylene composition according to claim 1, wherein Component A has a molecular weight distribution of about 10 to about 35.

* * * * *